United States Patent
Liu et al.

(10) Patent No.: US 12,531,803 B2
(45) Date of Patent: Jan. 20, 2026

(54) METHOD AND APPARATUS FOR SENDING MULTICAST PACKET AND METHOD AND APPARATUS FOR OBTAINING FORWARDING ENTRY

(71) Applicant: HUAWEI TECHNOLOGIES CO., LTD., Shenzhen (CN)

(72) Inventors: Shuying Liu, Beijing (CN); Ting Liao, Nanjing (CN); Wei Fang, Shenzhen (CN); Rui Gu, Beijing (CN); Jingrong Xie, Beijing (CN); Xuesong Geng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 319 days.

(21) Appl. No.: 18/168,395

(22) Filed: Feb. 13, 2023

(65) Prior Publication Data
US 2023/0198892 A1    Jun. 22, 2023

Related U.S. Application Data

(63) Continuation of application No. PCT/CN2021/111621, filed on Aug. 9, 2021.

(30) Foreign Application Priority Data

Aug. 13, 2020  (CN) .......................... 202010815027.1
Nov. 13, 2020  (CN) .......................... 202011271120.7

(51) Int. Cl.
*H04W 4/00*   (2018.01)
*H04L 45/16*  (2022.01)
*H04L 45/741* (2022.01)

(52) U.S. Cl.
CPC ............ *H04L 45/16* (2013.01); *H04L 45/741* (2013.01)

(58) Field of Classification Search
CPC ....... H04L 45/16; H04L 45/741; H04L 45/34; H04W 4/06
See application file for complete search history.

(56) References Cited

U.S. PATENT DOCUMENTS

2016/0191372 A1*  6/2016  Zhang ................. H04L 49/3009
                                                           370/390
2018/0278522 A1*  9/2018  Asati ...................... H04L 45/64
(Continued)

FOREIGN PATENT DOCUMENTS

CN           111385206 A       7/2020

OTHER PUBLICATIONS

Wijnands et al., "Encapsulation for Bit Index Explicit Replication (BIER) in MPLS and Non-MPLS Networks," Internet Engineering Task Force (IETF), Request for Comments: 8296, total 24 pages (Jan. 2018).

(Continued)

*Primary Examiner* — Abdelnabi O Musa
(74) *Attorney, Agent, or Firm* — Leydig, Voit & Mayer, Ltd.

(57) ABSTRACT

A method for sending a multicast packet and a related apparatus are provided. The method includes: a first network device obtains a first multicast packet, wherein the first multicast packet includes a bit string and an identifier of a network slice, the bit string corresponds to a second network device, and the network slice corresponds to a multicast service of the second network device. The first network device obtains, based on the bit string and the identifier of the network slice, a first interface corresponding to the network slice. The first network device sends the first multicast packet to the second network device by using the first interface.

18 Claims, 10 Drawing Sheets

(56) References Cited

U.S. PATENT DOCUMENTS

| | | | |
|---|---|---|---|
| 2019/0296922 A1 | 9/2019 | Dutta | |
| 2019/0342213 A1* | 11/2019 | Asati | H04L 45/64 |
| 2020/0259672 A1* | 8/2020 | Meng | H04L 12/1886 |
| 2020/0403903 A1* | 12/2020 | Xie | H04L 45/507 |
| 2022/0116309 A1* | 4/2022 | Lin | H04L 45/16 |
| 2022/0182309 A1* | 6/2022 | Bataineh | H04L 45/38 |
| 2022/0286383 A1* | 9/2022 | Xie | H04L 45/54 |
| 2023/0040579 A1* | 2/2023 | Peng | H04L 45/04 |
| 2023/0081052 A1* | 3/2023 | Xie | H04L 45/54 370/390 |
| 2023/0133944 A1* | 5/2023 | Zhang | H04L 45/14 370/390 |
| 2023/0155932 A1* | 5/2023 | Zhang | H04L 45/34 709/238 |
| 2023/0308386 A1* | 9/2023 | Duan | H04L 45/748 |
| 2024/0056383 A1* | 2/2024 | Geng | H04L 45/566 |

OTHER PUBLICATIONS

Wijnands et al., "Multicast Using Bit Index Explicit Replication (BIER)," Internet Engineering Task Force (IETF), Request for Comments: 8279, total 43 pages (Nov. 2017).

\* cited by examiner

METHOD AND APPARATUS FOR SENDING MULTICAST PACKET AND METHOD AND APPARATUS FOR OBTAINING FORWARDING ENTRY

CROSS-REFERENCE TO RELATED APPLICATIONS

This application is a continuation of International Application No. PCT/CN2021/111621, filed on Aug. 9, 2021, which claims priority to Chinese Patent Application No. 202010815027.1, filed on Aug. 13, 2020, and claims priority to Chinese Patent Application No. 202011271120.7, filed on Nov. 13, 2020. All of the aforementioned patent applications are hereby incorporated by reference in their entireties.

TECHNICAL FIELD

Embodiments of the present application relate to the field of communications technologies, and in particular, to a method and an apparatus for sending a multicast packet and a method and an apparatus for obtaining a forwarding entry.

BACKGROUND

A network slice is obtained by dividing a logical resource based on a common network, so that a group of logical networks with shared or dedicated network resources are allocated to a specific network slice. A network slice is used to carry a specific service, for example, a mobile service, a private line service, a telemedicine service, or another service for which a network forwarding resource needs to be reserved. Currently, a multicast service and a low-priority unicast service are not distinguished in terms of the network slice, that is, the multicast service and the low-priority unicast service share a default network slice. In the default network slice, a packet of the multicast service and a packet of the low-priority unicast service are forwarded through queue scheduling. When the packet of the multicast service and the packet of the low-priority unicast service share a queue, transmission quality such as a transmission delay and packet loss of the multicast service cannot be ensured.

SUMMARY

Embodiments of this application provide a method and an apparatus for sending a multicast packet and a method and an apparatus for obtaining a forwarding entry, to ensure transmission quality of a multicast service.

According to a first aspect, a method for sending a multicast packet is provided. The method includes: A first network device obtains a first multicast packet, where the first multicast packet includes a bit string and an identifier of a network slice, the bit string corresponds to a second network device, and the network slice corresponds to a multicast service of the second network device; the first network device obtains, based on the bit string and the identifier of the network slice, a first interface corresponding to the network slice; and the first network device sends the first multicast packet to the second network device by using the first interface.

In the method, the first network device may determine, based on the identifier of the network slice carried in the multicast packet, the first interface corresponding to the network slice, and further can send the multicast packet by using the specific network slice, to ensure transmission quality of the multicast service.

In a possible implementation, that the first network device obtains, based on the bit string and the identifier of the network slice, a first interface corresponding to the network slice includes: The first network device searches a first forwarding entry by using the bit string and the identifier of the network slice that are included in the first multicast packet, to obtain an identifier of the first interface, where the first forwarding entry includes the bit string, the identifier of the network slice, and the identifier of the first interface.

In a possible implementation, before the first network device obtains the first multicast packet, the method further includes: The first network device obtains the identifier of the network slice and a bit forwarding router identifier (BFR-id) of the second network device; the first network device obtains the bit string based on the BFR-id; and the first network device obtains the first forwarding entry based on the bit string and the identifier of the network slice.

In a possible implementation, that the first network device obtains, based on the bit string and the identifier of the network slice, a first interface corresponding to the network slice includes: The first network device searches a second forwarding entry by using the bit string included in the first multicast packet, to obtain an identifier of a second interface that communicates with the second network device, where the second forwarding entry includes the bit string and the identifier of the second interface; and the first network device searches a first forwarding entry by using the identifier of the second interface and the identifier of the network slice included in the first multicast packet, to obtain an identifier of the first interface, where the first forwarding entry includes the identifier of the second interface, the identifier of the network slice, and the identifier of the first interface.

In a possible implementation, before the first network device obtains the first multicast packet, the method further includes: The first network device obtains the identifier of the network slice and a BFR-id of the second network device; the first network device obtains the bit string based on the BFR-id; the first network device obtains the second forwarding entry based on the bit string and the identifier of the second interface; the first network device obtains, based on the identifier of the second interface, the identifier of the first interface corresponding to the identifier of the network slice; and the first network device obtains the first forwarding entry based on the identifier of the second interface, the identifier of the first interface, and the identifier of the network slice.

In a possible implementation, the first network device is a bit forwarding ingress router (BFIR) or an intermediate bit forwarding router (BFR).

In a possible implementation, the first network device is a BFIR, and that a first network device obtains a first multicast packet includes: The first network device receives a second multicast packet from a multicast source, where the second multicast packet includes multicast source and group information, and the multicast source and group information corresponds to the second network device; the first network device obtains, based on the multicast source and group information, the bit string and the identifier of the network slice that correspond to the multicast source and group information; and the first network device obtains the first multicast packet based on the second multicast packet, the bit string, and the identifier of the network slice, where the first multicast packet further includes the second multicast packet. The multicast source and group information includes an address of the multicast source and an address of a multicast group.

In a possible implementation, the first network device is an intermediate BFR, and that a first network device obtains a first multicast packet includes: The first network device receives the first multicast packet sent by a BFIR.

In a possible implementation, the first multicast packet includes an internet protocol version 6 (IPv6) header, and the IPv6 header includes the identifier of the network slice.

In a possible implementation, a destination address (DA) field in the IPv6 header includes the identifier of the network slice; or a source address (SA) field in the IPv6 header includes the identifier of the network slice. The identifier of the network slice is carried in 32 bits in the DA field or the SA field. When the DA field is a segment identifier (SID) in segment routing over IPv6 (SRv6), a bit index explicit replication (BIER) node (end.BIER) of the SID includes the identifier of the network slice.

In a possible implementation, the first multicast packet includes an IPv6 extension header, and the IPv6 extension header includes the identifier of the network slice.

In a possible implementation, the first multicast packet includes a hop-by-hop options header, and the hop-by-hop options header includes the identifier of the network slice.

In a possible implementation, the first multicast packet includes a destination options header, and the destination options header includes the identifier of the network slice. A BIER header in the destination options header includes the identifier of the network slice.

In a possible implementation, the first interface is a logical interface related to the second interface that communicates with the second network device. The first interface is a flexible Ethernet (FlexE) interface or a sub-interface. The sub-interface may be a channelized sub-interface.

In a possible implementation, the network slice corresponds to one or more multicast virtual private network (MVPN) services, or the network slice corresponds to one or more virtual private network (VPN) services.

According to a second aspect, a method for obtaining a forwarding entry is provided. The method includes: A first network device obtains an identifier of a network slice, where the network slice corresponds to a multicast service of a second network device; and the first network device obtains a first forwarding entry based on the identifier of the network slice, where the first forwarding entry includes the identifier of the network slice and an identifier of a first interface that communicates with the second network device.

In the method, a correspondence is established between the identifier of the network slice allocated to the multicast service and the first interface, to form a forwarding entry, so that the multicast service that carries the identifier of the network slice can be forwarded by using the first interface and the corresponding network slice, to ensure transmission quality of the multicast service.

In a possible implementation, the first forwarding entry further includes a bit string, the bit string corresponds to the second network device, and the method further includes: The first network device receives a BFR-id sent by the second network device; and the first network device obtains the bit string based on the BFR-id.

In a possible implementation, after the obtaining a first forwarding entry, the method further includes: The first network device obtains a first multicast packet, where the first multicast packet includes the bit string and the identifier of the network slice; the first network device searches the first forwarding entry by using the bit string and the identifier of the network slice that are included in the first multicast packet, to obtain the identifier of the first interface; and the first network device sends the first multicast packet to the second network device based on the identifier of the first interface.

In a possible implementation, the first forwarding entry further includes an identifier of a second interface that communicates with the second network device, and the method further includes: The first network device receives a bit forwarding router identifier BFR-id sent by the second network device; the first network device obtains a bit string based on the BFR-id, where the bit string corresponds to the second network device; and the first network device obtains a second forwarding entry based on the bit string and the identifier of the second interface, where the second forwarding entry includes the bit string and the identifier of the second interface.

In a possible implementation, after the obtaining a first forwarding entry, the method further includes: The first network device obtains a first multicast packet, where the first multicast packet includes the bit string and the identifier of the network slice; the first network device searches the second forwarding entry by using the bit string included in the first multicast packet, to obtain the identifier of the second interface; and the first network device searches the first forwarding entry by using the identifier of the second interface and the identifier of the network slice included in the first multicast packet, to obtain the identifier of the first interface.

In a possible implementation, for a manner of carrying the identifier of the network slice, refer to the corresponding content in the first aspect. Details are not described herein. The first multicast packet includes an internet protocol version 6 IPv6 header, and the IPv6 header includes the identifier of the network slice.

In a possible implementation, the first interface is a logical interface related to the second interface that communicates with the second network device. The first interface is a FlexE interface or a sub-interface.

In a possible implementation, the network slice corresponds to one or more MVPN services, or the network slice corresponds to one or more VPN services.

In the second aspect, the first network device is a BFIR or an intermediate BFR, and the second network device is a bit forwarding egress router (BFER).

According to a third aspect, an apparatus for sending a multicast packet is provided. The apparatus is disposed in a first network device, and the apparatus includes a unit configured to implement a function corresponding to the step in the first aspect or the possible implementation of the first aspect.

According to a fourth aspect, an apparatus for obtaining a forwarding entry is provided. The apparatus is disposed in a first network device, and the apparatus includes a unit configured to implement a function corresponding to the step in the second aspect or the possible implementation of the second aspect.

According to a fifth aspect, a system is provided. The system includes the apparatus for sending a multicast packet provided in the third aspect or the apparatus for obtaining a forwarding entry provided in the fourth aspect.

According to a sixth aspect, a chip is provided. The chip includes a memory and a processor. The memory is configured to store computer instructions. The processor is configured to: invoke the computer instructions from the memory, and run the computer instructions, to perform the method for sending a multicast packet provided in any one of the first aspect or the possible implementations of the first aspect, or to perform the method for obtaining a forwarding entry provided in any one of the second aspect or the possible implementations of the second aspect.

According to a seventh aspect, a computer program product is provided. The computer program product includes one or more computer program instructions. When one or more computer program instructions are loaded and executed by a computer, the computer is enabled to perform the method for sending a multicast packet provided in any one of the first aspect or the possible implementations of the first aspect, or to perform the method for obtaining a forwarding entry provided in any one of the second aspect or the possible implementations of the second aspect.

According to an eighth aspect, a computer-readable storage medium is provided. The computer-readable storage medium is configured to store instructions. The instructions include a program designed for performing the method for sending a multicast packet provided in any one of the first aspect or the possible implementations of the first aspect. Alternatively, the instructions include a program designed for performing the method for obtaining a forwarding entry provided in any one of the second aspect or the possible implementations of the second aspect.

According to a ninth aspect, an apparatus for sending a multicast packet is provided. The apparatus for sending a multicast packet includes a processor and a non-transitory computer-readable storage medium that stores program instructions to be executed by the processor. The program instructions indicate the processor to perform the method for sending a multicast packet provided in any one of the first aspect or the possible implementations of the first aspect.

According to a tenth aspect, an apparatus for obtaining a forwarding entry is provided. The apparatus for obtaining a forwarding entry includes a processor and a non-transitory computer-readable storage medium that stores program instructions to be executed by the processor. The program instructions indicate the processor to perform the method for obtaining a forwarding entry provided in any one of the second aspect or the possible implementations of the second aspect.

BRIEF DESCRIPTION OF DRAWINGS

FIG. 6(*b*) shows yet another BIERv6 packet format according to an embodiment of this application;

DESCRIPTION OF EMBODIMENTS

To make the purpose, technical solutions, and advantages of embodiments of the present invention clearer, the following clearly and describes the technical solutions of embodiments of the present invention with reference to the accompanying drawings in embodiments of the present invention.

Figure 1:
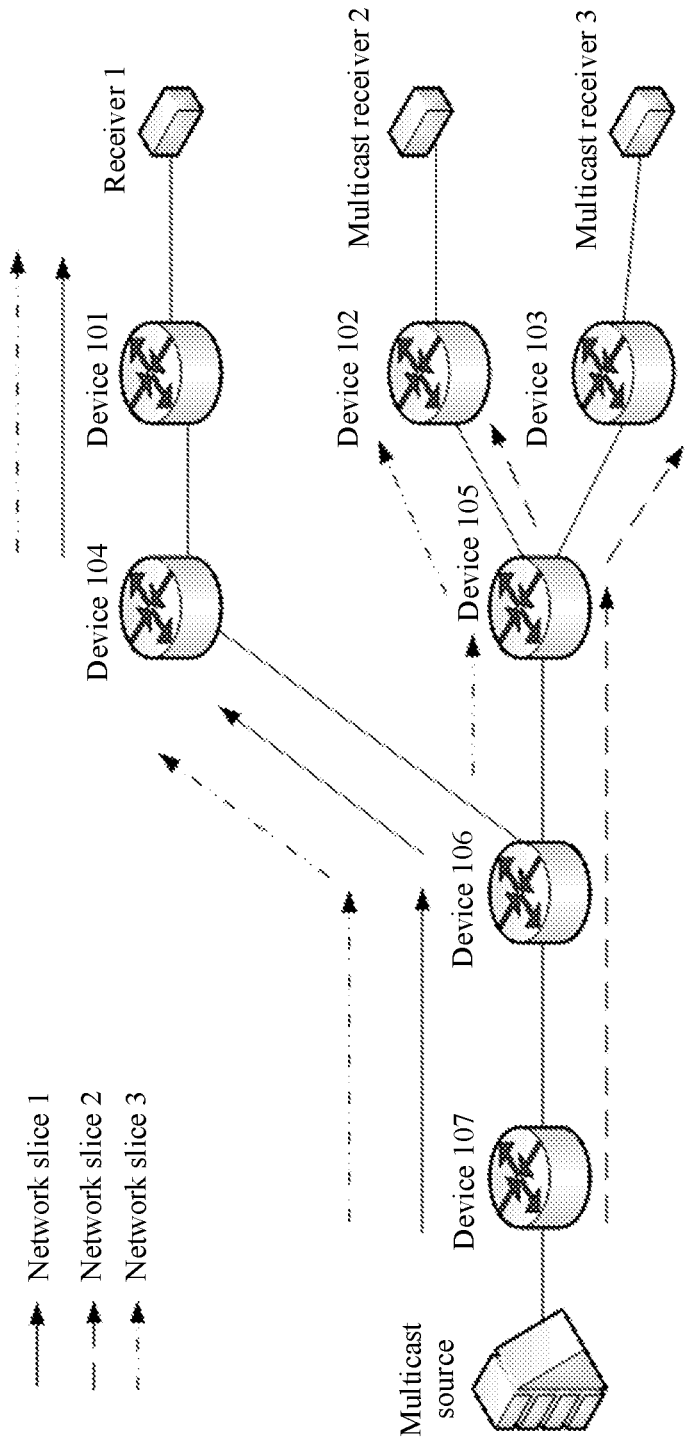
FIG. 1 is a schematic diagram of a network scenario according to an embodiment of this application.

FIG. 1 is a schematic diagram of a network scenario according to an embodiment of this application. In the network scenario shown in FIG. 1, a service carried by a network slice 1 is a unicast service, that is, a packet of the service carried by the network slice 1 is transmitted in a unicast manner, and a slice identifier (slice ID) 1 is used to identify the network slice 1; a service carried by a network slice 2 is a first multicast service, that is, a packet of the service carried by the network slice 2 is transmitted in a multicast manner, and a slice ID 2 is used to identify the network slice 2; and a service carried by a network slice 3 is a second multicast service, that is, a packet of the service carried by the network slice 3 is transmitted in a multicast manner. In the multicast manner, a packet may be sent and received by using bit index explicit replication (BIER). Three types of arrows in FIG. 1 are used to represent paths of physical links to which different network slices belong. A physical link corresponding to the network slice 1 may be represented as a device 107→a device 106→a device 104→a device 101→a receiver 1. The receiver 1 may be a multicast receiver and a user that receives a packet sent in a unicast manner. A physical link corresponding to the network slice 2 may be represented as the device 107→the device 106→a device 105→a device 102 and a device 103→a multicast receiver 2 and a multicast receiver 3. A physical link corresponding to the network slice 3 may be represented as the device 107→the device 106→the device 105 and the device 104→the device 102 and the device 101→the multicast receiver 2 and the receiver 1. The device 107 connected to S that serves as a multicast source is an ingress node, and is a bit forwarding ingress router (BFIR) in a BIER domain. The device 101, the device 102, and the device 103 that are respectively connected to the multicast receivers are egress nodes, and are bit forwarding egress routers (BFER) in the BIER domain. The device 101, the device 102, and the device 103 belong to a same BIER domain. A BFR-id of the device 101 is 1, a BFR-id of the device 102 is 2, and a BFR-id of the device 103 is 3. When a value of the BFR-id falls beyond a range of a bit string length (BSL), the value may be represented by using a combination of a set identifier (SI) and a bit string. In this embodiment of this application, an example in which the BFR-id does not fall beyond the range of the BSL is used for description. If the BFR-id falls beyond the range expressed by the BSL, the SI may be introduced to implement effective differentiation. The device 106, the device 105, and the device 104 are intermediate nodes, and are intermediate bit forwarding routers (BFR) in the BIER domain. The device 107, the device 106, the device 104, and the device 101 may support both a multicast service and a unicast service. The unicast service may be an SRv6-based unicast service. Alternatively, the unicast service may be an internet access service, an on-demand video service, a mobile data service, or the like. Any multicast service may be a BIERv6-based multicast service that includes but is not limited to a multicast service carried by BIERv6, for example, an interactive personality TV (IPTV) live service, an enterprise conference live service, or a video service synchronized by an enterprise headquarter to a branch of the enterprise headquarter. Certainly, the unicast service and the multicast service are merely examples, and may alternatively be other services. Examples are not described one by one herein. A network scenario and a method provided in embodiments of this application are described by using a BIER network as an example.

Embodiment 1

Figure 2:
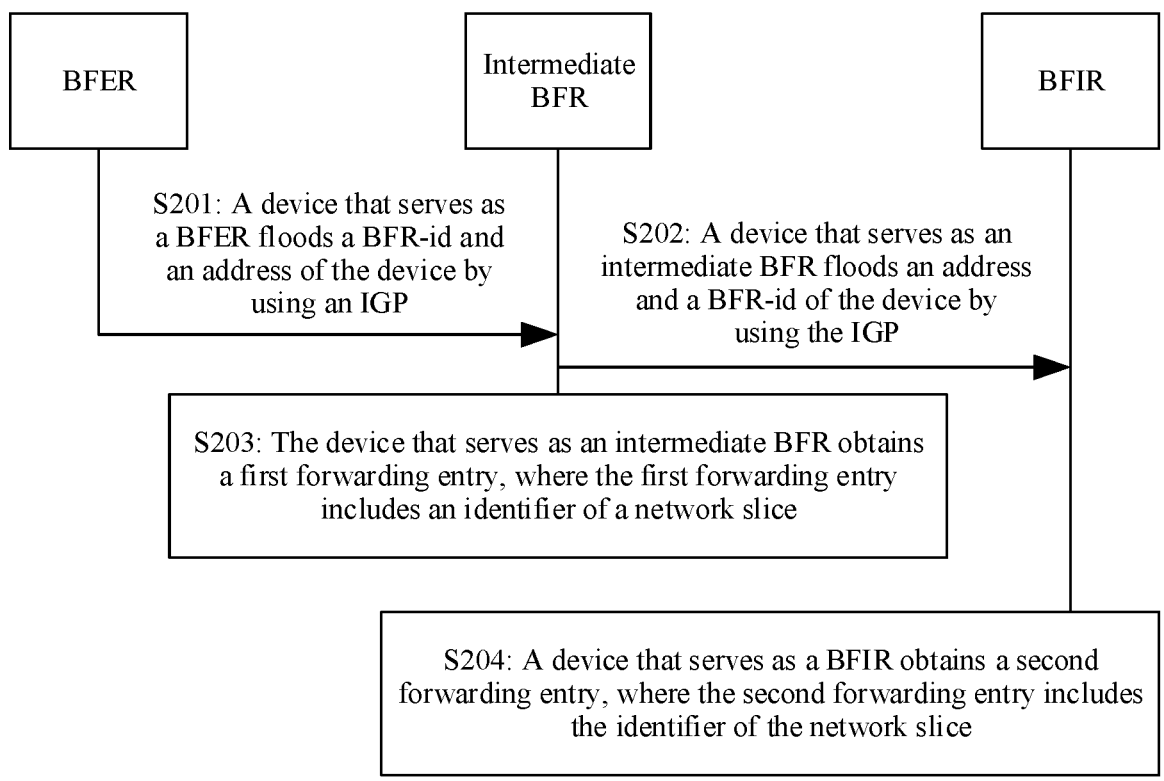
FIG. 2 is a flowchart of a method for obtaining a forwarding entry according to Embodiment 1 of this application.

FIG. 2 is a flowchart of a method for obtaining a forwarding entry according to Embodiment 1 of this application. In the method shown in FIG. 2, a receiver 1 and a multicast receiver 2 in FIG. 1 receive a packet of a first multicast service from a multicast source, and the multicast receiver 2 and a multicast receiver 3 in FIG. 1 receive a packet of a second multicast service from the multicast source. A BFIR, a BFER, and an intermediate BFR in a BIER domain may obtain a forwarding entry by using a configuration of a control plane. The method for obtaining a forwarding entry provided in Embodiment 1 of this application is described below with reference to FIG. 1 and FIG. 2.

S201: A device that serves as a BFER floods a BFR-id and an address of the device by using an IGP.

In a scenario shown in FIG. 1, a device 101 floods a BFR-id whose value is 1 and an address (which may be represented as a101) of the device 101 by using the IGP, a device 102 floods a BFR-id whose value is 2 and an address (which may be represented as a102) of the device 102 by using the IGP, and a device 103 floods a BFR-id whose value is 3 and an address (which may be represented as a103) of the device 103 by using the IGP. The address of the device in Embodiment 1 of this application may be an internet protocol version 4 (IPv4) address or an internet protocol version 6 (IPv6) address. A specific representation form of the address is not limited to a form in this embodiment of this application. In another possible implementation, another form of identifier of the device that serves as a BFER may be used to replace the address. The another form of identifier of the device that serves as a BFER may be information by using which the device can be obtained through routing, for example, a name. This is not limited in this embodiment of this application.

Optionally, the device that serves as a BFER may further flood, by using the IGP, an identifier of a network slice allocated to the device. In the scenario shown in FIG. 1, the device 101 may further flood a slice ID 1 and a slice ID 3 by using the IGP, the device 102 may further flood a slice ID 2 and the slice ID 3 by using the IGP, and the device 103 may further flood the slice ID 2 by using the IGP.

S202: A device that serves as an intermediate BFR floods an address and a BFR-id of the device by using the IGP.

For example, the device that serves as an intermediate BFR obtains, through flooding by using the IGP, the BFR-id of the device that serves as a BFER and a physical interface that receives the BFR-id. The device that serves as an intermediate BFR is directly connected or indirectly connected to the device that serves as a BFER. The device that serves as an intermediate BFR advertises, by using the IGP, the device address of the device and the BFR-id obtained by the device through flooding by using the IGP. In the scenario shown in FIG. 1, a device 104 obtains the BFR-id whose value is 1 by using the IGP, and records a physical interface (which may be represented as a physical interface 4-1) that receives the BFR-id whose value is 1. The device 104 floods the BFR-id whose value is 1 and an address (which may be represented as a104) of the device 104 by using the IGP. A device 105 obtains the BFR-id whose value is 3 and the BFR-id whose value is 2 by using the IGP, and records a physical interface (which may be represented as a physical interface 5-1) that receives the BFR-id whose value is 2 and a physical interface (which may be represented as a physical interface 5-2) that receives the BFR-id whose value is 3. The device 105 may further obtain the BFR-id whose value is 1 by using the IGP, and records a physical interface (which may be represented as a physical interface 5-3) that receives the BFR-id whose value is 1. The physical interface 5-3 communicates with a device 106. The device 105 floods the BFR-id whose value is 2, the BFR-id whose value is 3, and an address (which may be represented as a105) of the device 105 by using the IGP. The device 106 obtains the BFR-id whose value is 3, the BFR-id whose value is 2, and the BFR-id whose value is 1 by using the IGP. The device 106 records a physical interface (which may be represented as a physical interface 6-1) that receives the BFR-id whose value is 1 and a physical interface (which may be represented as a physical interface 6-2) that receives the BFR-id whose value is 2 and the BFR-id whose value is 3. The device 106 floods the BFR-id whose value is 3, the BFR-id whose value is 2, the BFR-id whose value is 1, and an address (which may be represented as a106) of the device 106 by using the IGP. A device 107 obtains the BFR-id whose value is 3, the BFR-id whose value is 2, and the BFR-id whose value is 1 by using the IGP. The device 107 records a physical interface (which may be represented as a physical interface 7-1) that receives the BFR-id whose value is 1, the BFR-id whose value is 2, and the BFR-id whose value is 3. The BFR-id may be represented in a form of a bit string or a form of a natural number. If the BFR-id is represented in the form of a bit string, the BFR-id whose value is 1 and that is flooded by the device 101 or the device 104 by using the IGP is represented as 0001, the BFR-id whose value is 2 and that is flooded by the device 102 by using the IGP is represented as 0010, the BFR-id whose value is 3 and that is flooded by the device 103 by using the IGP is represented as 0100, the BFR-id whose value is 2 and the BFR-id whose value is 3 that are flooded by the device 105 by using the IGP are represented as 0110, and the BFR-id whose value is 1, the BFR-id whose value is 2, and the BFR-id whose value is 3 that are flooded by the device 106 by using the IGP are represented as 0111. If the BFR-id is represented in the form of a natural number, the device that obtains the BFR-id in the BIER domain may convert the BFR-id into the form of a bit string. A conversion process is no longer described herein.

Optionally, the device that serves as an intermediate BFR may further flood, by using the IGP, an identifier of a network slice allocated to the device. In the scenario shown in FIG. 1, the device 104 may further flood the slice ID 1 and the slice ID 3 by using the IGP, the device 105 may further flood the slice ID 2 and the slice ID 3 by using the IGP, and the device 106 may further flood the slice ID 1, the slice ID 2, and the slice ID 3 by using the IGP.

S203: The device that serves as an intermediate BFR obtains a first forwarding entry, where the first forwarding entry includes the identifier of the network slice.

For example, in Embodiment 1 of this application, a control plane of the device that serves as an intermediate BFR may pre-allocate a network slice to a multicast service, that is, configure an identifier of a network slice and a sub-interface related to a physical interface for a multicast service required by a multicast receiver. If a physical interface of the device that serves as an intermediate BFR supports flexible Ethernet (FlexE), a sub-interface related to the physical interface of the device that serves as an intermediate BFR is a FlexE interface. If a physical interface of the device that serves as an intermediate BFR does not support flexible Ethernet (FlexE), a sub-interface related to the physical interface of the device that serves as an intermediate BFR is a channelized sub-interface. In this embodiment of this application, the sub-interface represents a FlexE interface or a channelized sub-interface. The device that serves as an intermediate BFR obtains the first forwarding entry based on the BFR-id obtained through flooding by using the IGP, the identifier of the network slice, and a sub-interface related to the physical interface. Alternatively, the device that serves as an intermediate BFR obtains, based on the identifier of the network slice and a sub-interface related to the physical interface, the first forwarding entry corresponding to the BFR-id. In the scenario shown in FIG. 1, a multicast service is used as an example. The device 105 and the device 106 that serve as intermediate BFRs may be configured to transmit packets of multicast services corresponding to a network slice 2 and a network slice 3, and the slice ID 2 and the slice ID 3 are allocated to each of the device 105 and the device 106. The device 104 that serves as an intermediate BFR is configured to transmit the packet of the multicast service corresponding to the network slice 3, and the slice ID 3 is allocated to the device 104. A first sub-interface (which may be represented as a sub-interface 4-1-1) related to the physical interface 4-1 of the device 104 corresponds to the slice ID 3. Sub-interfaces related to the physical interface 5-1 of the device 105 include a first sub-interface (which may be represented as a sub-interface 5-1-1) and a second sub-interface (5-1-2). The first sub-interface (which may be represented as the sub-interface 5-1-1) corresponds to the slice ID 2. The second sub-interface (which may be represented as the sub-interface 5-1-2) corresponds to the slice ID 3. A sub-interface related to the physical interface 5-2 of the device 105 includes a third sub-interface (which may be represented as a sub-interface 5-2-1). The third sub-interface (which may be represented as the sub-interface 5-2-1) corresponds to the slice ID 2. A first sub-interface (which may be represented as a sub-interface 6-1-1) included in a sub-interface related to the physical interface (6-1) of the device 106 corresponds to the slice ID 3. A second sub-interface (which may be represented as a sub-interface 6-2-1) included in a sub-interface related to the physical interface (6-2) of the device 106 corresponds to the slice ID 2. A third sub-interface (which may be represented as a sub-interface 6-2-2) included in the sub-interface related to the physical interface (6-2) of the device 106 corresponds to the slice ID 3. In the scenario shown in FIG. 1, the device 104 and the device 101 may be further configured to transmit a packet of a unicast service corresponding to a network slice 1, and the slice ID 1 may be further allocated to the device 104. A sub-interface related to the physical interface 4-1 of the device 104 is a sub-interface 4-1-2, and is configured to transmit the packet of the unicast service corresponding to the network slice 1. A sub-interface related to the physical interface 5-3 of the device 105 includes a fourth sub-interface (which may be represented as a sub-interface 5-3-1). The fourth sub-interface (which may be represented as the sub-interface 5-3-1) corresponds to the slice ID 1. In this embodiment of this application, the identifier of the network slice may be obtained through flooding by using the IGP or by using a configuration. This is not limited in this embodiment of this application.

In a first implementation, the first forwarding entry includes the BFR-id, the identifier of the network slice, and the sub-interface related to the physical interface. In the scenario shown in FIG. 1, a first forwarding entry obtained by the device 104 may be represented as Table 2-1. A bit string in a BFR-id field is used to match a bit string included in a received BIER multicast packet. An identifier in a slice ID field is used to match a slice ID included in the received BIER multicast packet. A sub-interface is configured to forward the BIER multicast packet.

TABLE 2-1

| BFR-id | Slice ID | Sub-interface |
| --- | --- | --- |
| 0011 | 1 | Sub-interface 4-1-2 |
| 0011 | 3 | Sub-interface 4-1-1 |

A first forwarding entry obtained by the device 105 may be represented as Table 2-2. Meanings of a BFR-id field, a slice ID field, and a sub-interface field in Table 2-2 are the same as those of the corresponding fields in Table 2-1. Details are not described herein.

TABLE 2-2

| BFR-id | Slice ID | Sub-interface |
| --- | --- | --- |
| 0011 | 3 | Sub-interface 5-1-2 |
| 0011 | 3 | Sub-interface 5-3-1 |
| 0110 | 2 | Sub-interface 5-1-1 |
| 0110 | 2 | Sub-interface 5-2-1 |

A first forwarding entry obtained by the device 106 may be represented as Table 2-3. Meanings of a BFR-id field, a slice ID field, and a sub-interface field in Table 2-3 are the same as those of the corresponding fields in Table 2-1. Details are not described herein.

TABLE 2-3

| BFR-id | Slice ID | Sub-interface |
| --- | --- | --- |
| 0011 | 3 | Sub-interface 6-1-1 |
| 0011 | 3 | Sub-interface 6-2-1 |
| 0110 | 2 | Sub-interface 6-2-2 |

In a second implementation, the first forwarding entry includes the identifier of the network slice and the sub-interface related to the physical interface. The corresponding physical interface may be located based on the sub-interface. Optionally, the first forwarding entry further includes the physical interface. The device that serves as an intermediate BFR further obtains a BIFT entry. In the scenario shown in FIG. 1, a first forwarding entry obtained by the device 104 may be represented as Table 2-4, and a BIFT entry obtained by the device 104 may be represented as Table 2-5. The BIFT entry includes a BFR-id used as a sequence number, a forwarding bitmask (F-BM), and a neighbor (NBR) that serves as a next hop. The F-BM in Table 2-5 is used to perform an operation with a bit string in a received BIER multicast packet, to determine a bit string in a BIER multicast packet to be sent to the next hop and determine whether to continue a table search operation.

TABLE 2-4

| Physical interface (optional) | Slice ID | Sub-interface |
|---|---|---|
| Physical interface 4-1 | 3 | Sub-interface 4-1-1 |

TABLE 2-5

| BFR-id | F-BM | NBR |
|---|---|---|
| 1 | 0001 | Physical interface 4-1 |

A first forwarding entry obtained by the device 105 may be represented as Table 2-6, and an obtained BIFT entry may be represented as Table 2-7.

TABLE 2-6

| Physical interface (optional) | Slice ID | Sub-interface |
|---|---|---|
| Physical interface 5-1 | 2 | Sub-interface 5-1-1 |
| Physical interface 5-1 | 3 | Sub-interface 5-1-2 |
| Physical interface 5-2 | 2 | Sub-interface 5-2-1 |

TABLE 2-7

| BFR-id | F-BM | NBR |
|---|---|---|
| 1 | 0001 | Physical interface 5-3 |
| 2 | 0010 | Physical interface 5-1 |
| 3 | 0100 | Physical interface 5-2 |

A first forwarding entry obtained by the device 106 may be represented as Table 2-8, and an obtained BIFT entry may be represented as Table 2-9.

TABLE 2-8

| Physical interface (optional) | Slice ID | Sub-interface |
|---|---|---|
| Physical interface 6-1 | 3 | Sub-interface 6-1-1 |
| Physical interface 6-2 | 3 | Sub-interface 6-2-1 |
| Physical interface 6-2 | 2 | Sub-interface 6-2-2 |

TABLE 2-9

| BFR-id | F-BM | NBR |
|---|---|---|
| 1 | 0001 | Physical interface 6-1 |
| 2 | 0110 | Physical interface 6-2 |
| 3 | 0110 | Physical interface 6-2 |

S204: A device that serves as a BFIR obtains a second forwarding entry, where the second forwarding entry includes the identifier of the network slice.

For example, the network slice may be configured for the device that serves as a BFIR, and the device may obtain the second forwarding entry by using the method in S203. For details, refer to the corresponding content in S203. Details are not described herein.

In the scenario shown in FIG. 1, the device 107 that serves as a BFIR may be configured to transmit the packets of the multicast services corresponding to the network slice 2 and the network slice 3, and the slice ID 2, the slice ID 3, and the slice ID 1 are allocated to the device 107. A first sub-interface (which may be represented as a sub-interface 7-1-1) included in a sub-interface related to the physical interface 7-1 of the device 107 corresponds to the slice ID 2. A second sub-interface (which may be represented as a sub-interface 7-1-2) included in the sub-interface related to the physical interface 7-1 of the device 107 corresponds to the slice ID 3. The network slice whose slice ID is 1 corresponds to a unicast service, and therefore an entry of a multicast service does not include a parameter related to the slice ID 1.

In a first implementation, the second forwarding entry includes the BFR-id, the identifier of the network slice, and the sub-interface related to the physical interface. In the scenario shown in FIG. 1, a second forwarding entry obtained by the device 107 may be represented as Table 2-10.

TABLE 2-10

| BFR-id | Slice ID | Sub-interface |
|---|---|---|
| 0011 | 3 | Sub-interface 7-1-2 |
| 0110 | 2 | Sub-interface 7-1-1 |

In a second implementation, the second forwarding entry includes the identifier of the network slice and the sub-interface related to the physical interface. The corresponding sub-interface may be located based on the physical interface and the identifier of the slice. The device 107 that serves as a BFIR further obtains a BIFT entry. In the scenario shown in FIG. 1, a second forwarding entry obtained by the device 107 may be represented as Table 2-11, and the BIFT entry obtained by the device 107 may be represented as Table 2-12. The BIFT entry includes a BFR-id used as a sequence number, an F-BM, and an NBR.

TABLE 2-11

| Physical interface (optional) | Slice ID | Sub-interface |
|---|---|---|
| Physical interface 7-1 | 2 | Sub-interface 7-1-1 |
| Physical interface 7-1 | 3 | Sub-interface 7-1-2 |

TABLE 2-12

| BFR-id | F-BM | NBR |
|---|---|---|
| 1 | 0111 | Physical interface 7-1 |
| 2 | 0111 | Physical interface 7-1 |

A header part included in any one of Table 2-1 to Table 2-12 may be omitted. In this case, the forwarding entry and the BIFT entry in this embodiment of this application may be represented in a form of a correspondence or a mapping relationship. A specific representation form of the forwarding entry and the BIFT entry is not limited in this embodiment of this application.

During allocation of a network slice, multicast services of a virtual private network (VPN) may be allocated to one network slice, different multicast services of a VPN may be allocated to different network slices, or multicast services of a plurality of VPNs may be allocated to one network slice. In another possible implementation, multicast services of different multicast virtual private networks (MVPN) are allocated to different network slices, or multicast services of a plurality of MVPNs may be allocated to a same network slice. A possible manner of allocating the network slice is not limited in this embodiment of this application.

In the method for obtaining a forwarding entry provided in this embodiment of this application, a forwarding entry related to a network slice may be generated by using a parameter obtained through flooding by using the IGP, so that when a multicast packet is subsequently forwarded, the multicast packet can be sent by using the network slice, to meet a service level agreement (SLA) requirement of a multicast service.

Embodiment 2

Figure 3:
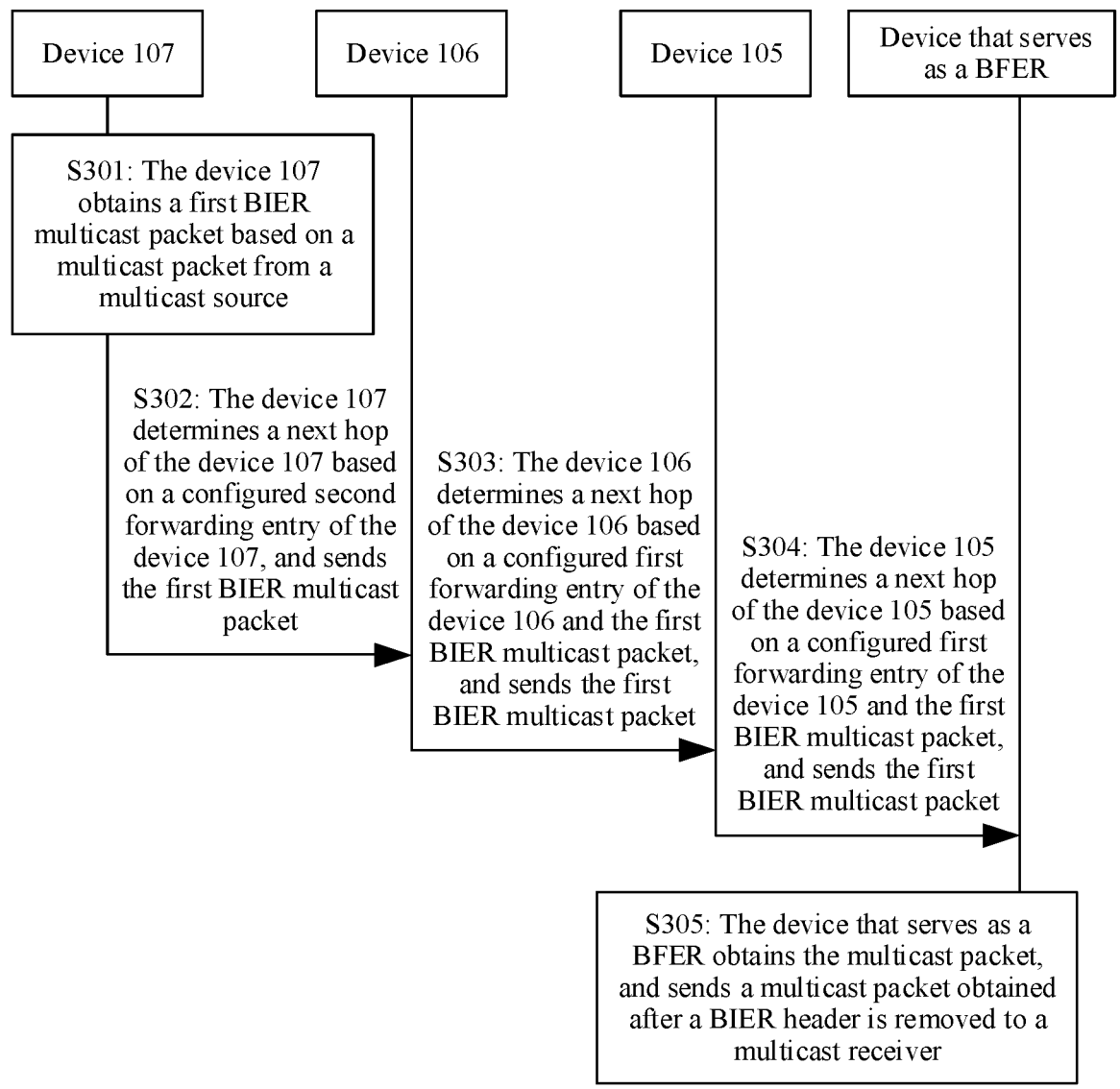
FIG. 3 is a flowchart of a method for forwarding a multicast packet according to Embodiment 2 of this application.

FIG. 3 is a flowchart of a method for forwarding a multicast packet according to Embodiment 2 of this application. In the method provided in Embodiment 2 of this application, an example in which a multicast packet of a multicast service corresponding to a network slice 2 is sent by using the network slice 2 is used for description. A device in a scenario in FIG. 1 may use the method provided in Embodiment 2 of this application to send, by using a network slice 3, a multicast packet of a multicast service corresponding to the network slice 3. This is no longer described in Embodiment 2 of this application. The method for forwarding a multicast packet provided in Embodiment 2 of this application is described below with reference to FIG. 3, FIG. 2, and FIG. 1.

S301: A device 107 obtains a first BIER multicast packet based on a multicast packet from a multicast source.

For example, the first BIER multicast packet includes a bit string and a slice ID. In the bit string, bits corresponding to a device 102 and a device 103 are set to 1, that is, the bit string may be represented as 0000 . . . 00000110 or represented as 0110. In a scenario in which a BSL is 256 bits, for the first representation manner, 244 bits whose value is 0 are omitted; and for the second representation manner, 252 bits whose value is 0 are omitted. The slice ID is a slice ID 2.

In an implementation, that a device 107 obtains a first BIER multicast packet based on a multicast packet from a multicast source includes: The device that serves as a BFIR receives the multicast packet from the multicast source, where the multicast packet includes multicast source and group information; the device that serves as a BFIR obtains information about at least one BFER and the slice ID based on a configured correspondence and the multicast source and group information included in the multicast packet, where the correspondence includes the multicast source and group information, the slice ID, and the information about the at least one BFER; the device that serves as a BFIR obtains the bit string based on the information about the at least one BFER; and the device that serves as a BFIR obtains the first multicast packet based on the slice ID, the bit string, and the multicast packet. In another implementation, that a device that serves as a BFIR obtains a first multicast packet includes: The device that serves as a BFIR receives the multicast packet from the multicast source, where the multicast packet includes multicast source and group information; the device that serves as a BFIR obtains the bit string and the slice ID based on a configured correspondence and the multicast source and group information included in the multicast packet, where the correspondence includes the multicast source and group information, the slice ID, and the bit string; and the device that serves as a BFIR obtains the first multicast packet based on the slice ID, the bit string, and the multicast packet. The multicast source and group information includes an address of the multicast source and an address of a multicast group. The information about the at least one BFER may be a BFR-id of the at least one BFER. Optionally, the first multicast packet further includes an SI to which the bit string belongs. A combination of the SI and the bit string may be used to identify one or more BFERs. In other words, the combination of the SI and the bit string is used to determine one or more BFR-ids, and any one of the one or more BFR-ids is used to identify the BFER.

In the scenario shown in FIG. 1, the device 107 receives the multicast packet sent by the multicast source, and obtains the bit string and the slice ID based on the multicast source and group information (S, G) in the multicast packet. Herein, S represents the address of the multicast source, and G represents the address of the multicast group. The device 107 obtains the bit string whose corresponding value is 0110 and the slice ID 2 based on (S, G). The device 107 that serves as a BFIR may add a BIER header to the obtained multicast packet, to obtain the first BIER multicast packet. Optionally, the device 107 may further add the bit string to a BIER option in the first BIER multicast packet. This is not limited in this embodiment of this application.

The following methods for adding the slice ID to the multicast packet are provided in this embodiment of this application. Details are as follows:

Manner 1

Figure 4:
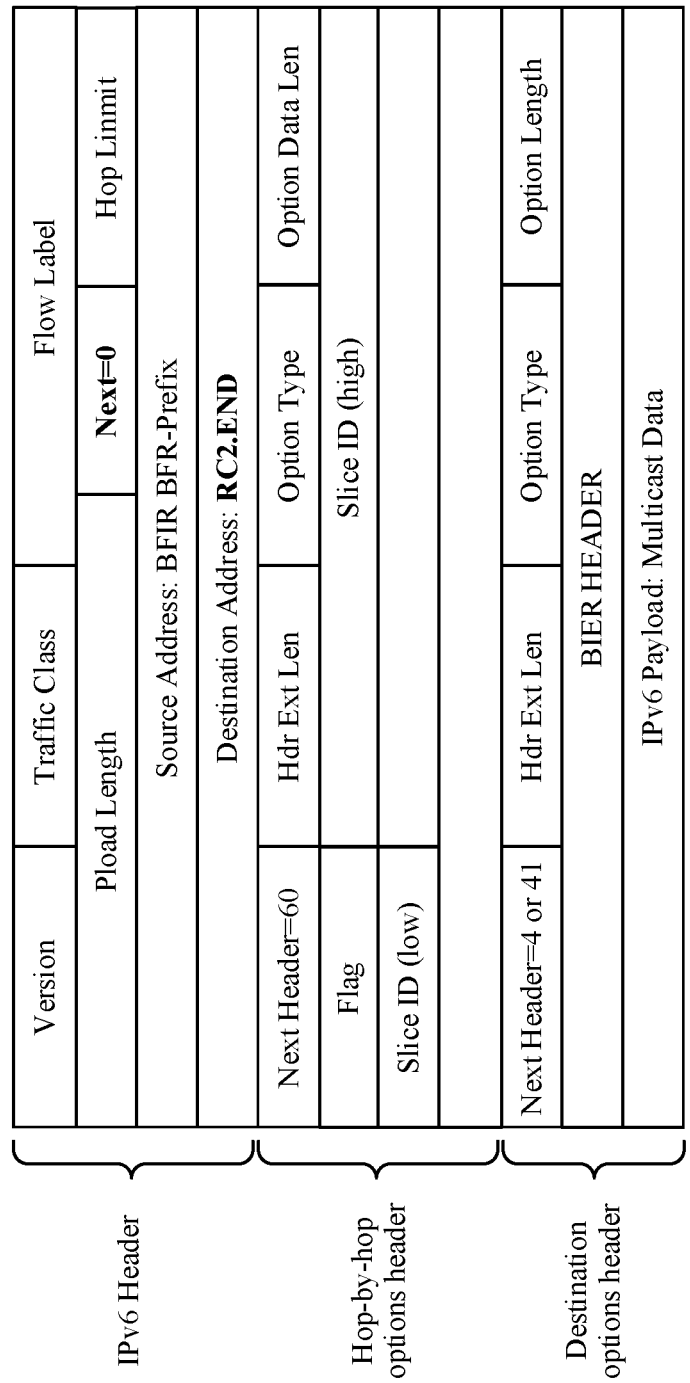
FIG. 4 shows a bit index explicit replication internet protocol version 6 encapsulation (BIERv6) packet format according to an embodiment of this application.

For a BIERv6 packet format shown in FIG. 4, a first preset value is assigned to a next header (NH) field included in an IPv6 header, which indicates that the IPv6 header is followed by a hop-by-hop options header. The first preset value may be 0, or the first preset value may be replaced with another value that may be used. This is not limited in this embodiment of this application. A value 60 is assigned to a next header field included in the hop-by-hop options header, which indicates that a header following the hop-by-hop options header is a destination options header. Optionally, the destination options header may further include a BIER option. A first specific value is assigned to an option type included in the hop-by-hop options header, which indicates that the hop-by-hop options header carries a first TLV. The first TLV is used to carry the slice ID. Optionally, a flag field included in the hop-by-hop options header is used to identify slice matching. In this embodiment of this application, the slice ID includes 4 bytes, and the slice ID may be represented in a manner of splitting a high byte and a low byte shown in FIG. 4. A value 4 is assigned to the NH field included in the destination options header, which indicates that an IPv6 payload following the destination options header carries IPv4 multicast data, for example, an IPv4 multicast packet. A value 41 is assigned to the NH field included in the destination options header, which indicates that an IPv6 payload following the destination options header carries IPv6 multicast data, for example, an IPv6 multicast packet. The packet format shown in FIG. 4 is used for the first multicast packet in this embodiment of this application, and the device 107 that serves as a BFIR may add the slice ID 2 to the first TLV in the hop-by-hop options header based on a definition in the packet format shown in FIG. 4, to obtain the first BIER multicast packet.

Manner 2

Figure 5:
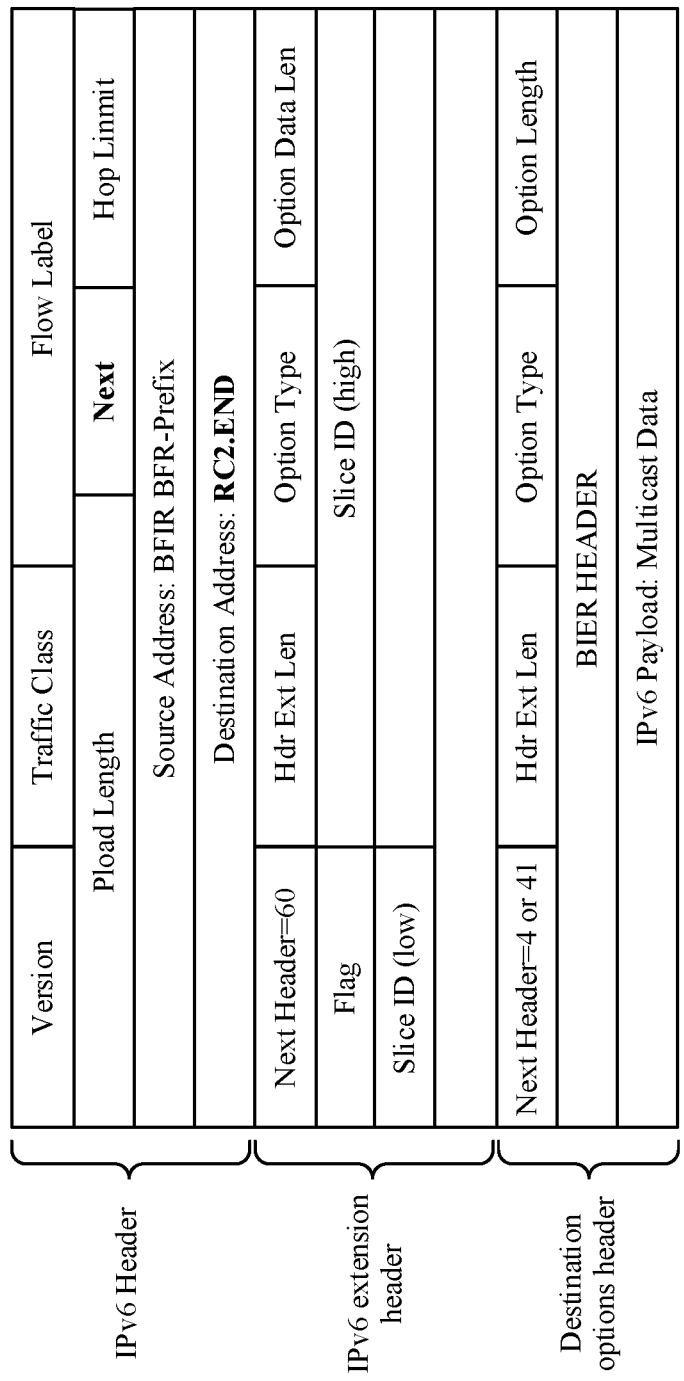
FIG. 5 shows another BIERv6 packet format according to an embodiment of this application.

For a BIERv6 packet format shown in FIG. 5, a second preset value is assigned to an NH field included in an IPv6 header, which indicates that the IPv6 header is followed by an IPv6 extension header. The IPv6 extension header is a new IPv6 header. A value 60 is assigned to an NH field included in the IPv6 extension header, which indicates that a header following the IPv6 extension header is a destination options header. Optionally, the destination options header may further include a BIER option. A third preset value is assigned to an option type included in the IPv6 extension header, which indicates that the IPv6 extension header carries a second TLV. The second TLV is used to carry the slice ID. Optionally, a flag field included in the IPv6 extension header is used to identify slice matching. In this embodiment of this application, the slice ID includes 4 bytes, and the slice ID may be represented in a manner of splitting a high byte and a low byte shown in FIG. 5. A value 4 or 41 is assigned to an NH field included in the destination options header. For corresponding content of the NH field, refer to the corresponding content in the manner 1. The packet format shown in FIG. 5 is used for the first multicast packet in this embodiment of this application, and the device 107 that serves as a BFIR may add the slice ID 2 to the second TLV in the IPv6 extension header based on a definition in the packet format shown in FIG. 5, to obtain the first multicast packet.

Manner 3

Figure 6:
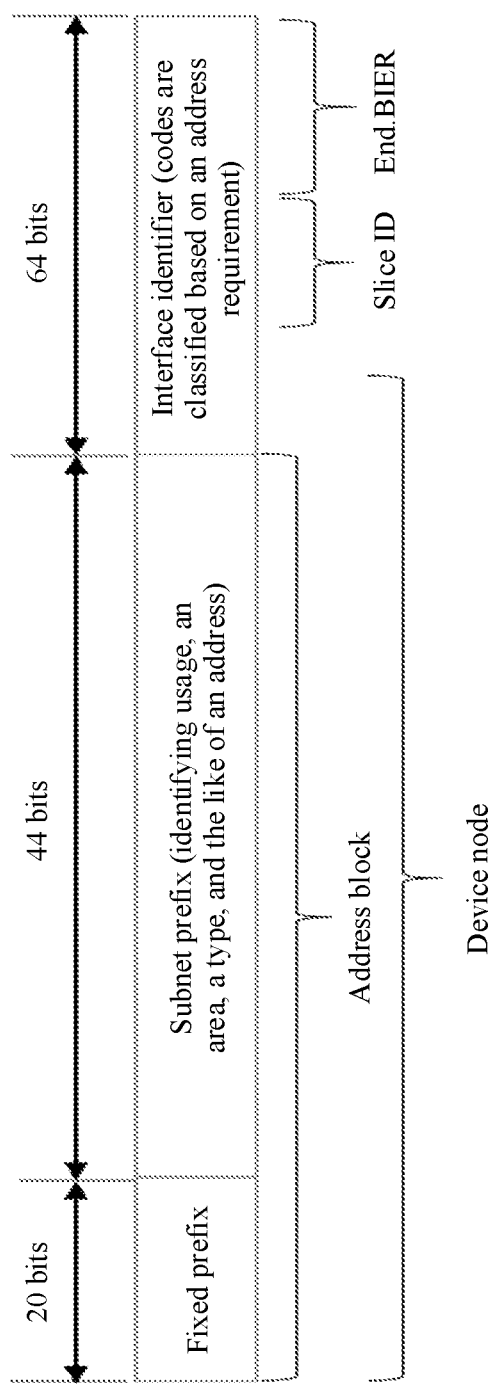
FIG. 6(*a*) shows still another BIERv6 packet format according to an embodiment of this application.
Figure 6B:
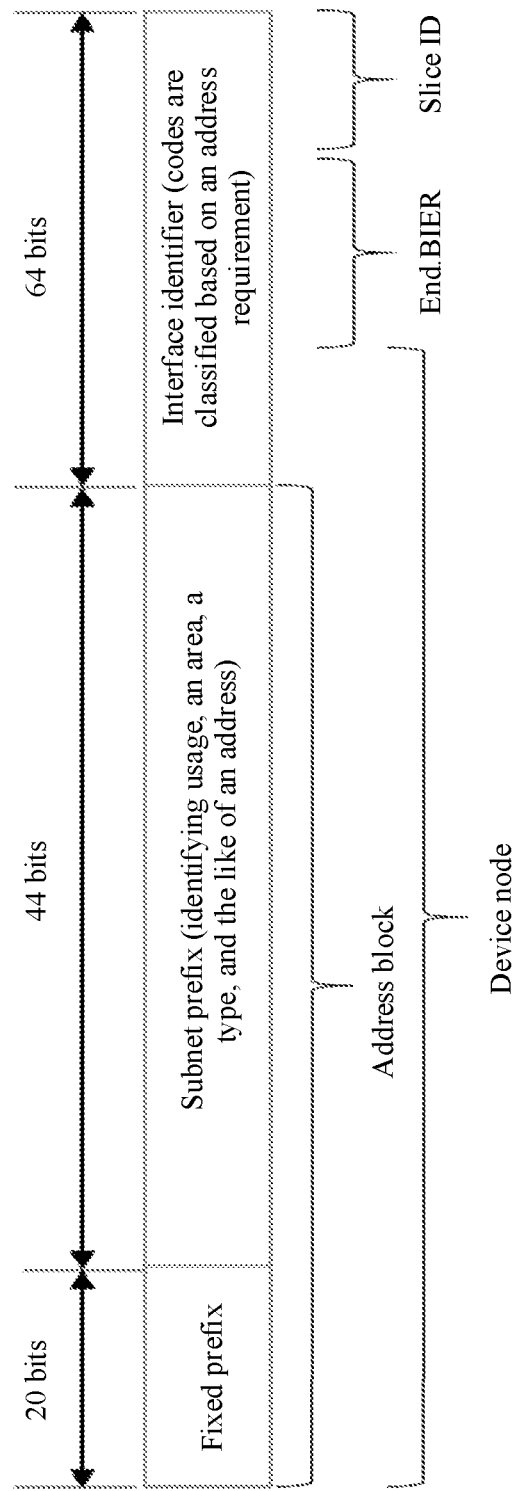

For a destination address (DA) field in a BIERv6 packet shown in FIG. 6(*a*) and FIG. 6(*b*), the DA field is used to carry the slice ID. For example, space used to carry the slice ID is allocated from 64 bits that are included in the DA field and that are used to carry an interface identifier, and may be 32 bits, namely, 4 bytes. A BIER node (end.bier) address is used for routing and forwarding. In a 64-bit interface identifier field included in FIG. 6(*a*) and FIG. 6(*b*), a device may be identified by using configurations of an address type, an aggregation network, and an access network device. A location relationship between the slice ID and the End.BIER may be shown in FIG. 6(*a*) and FIG. 6(*b*). The format shown in FIG. 6(*a*) and FIG. 6(*b*) may be used for the first multicast packet in this embodiment of this application, and the device 107 that serves as a BFIR may add the slice ID 2 to the DA field based on the foregoing configuration, to obtain the first BIER multicast packet. When the DA field is a segment identifier (SID) in segment routing over IPv6 (SRv6), a bit index explicit replication (BIER) node (end.BIER) of the SID includes the identifier of the network slice. In another possible implementation, the End.BIER address may be set to an address corresponding to the slice ID, and the device that serves as a BFIR and an intermediate BFR may store a correspondence between the End.BIER address and the slice ID, further obtain the slice ID based on the End.BIER address and the correspondence, and then searches a table by using the slice ID, to determine an interface corresponding to the identifier of the network slice. When the End. BIER address is set to an address corresponding to the slice ID, there can be relatively good compatibility with a device in a common network scenario, and modification to the multicast packet can be avoided as much as possible.

Manner 4

Figure 7:
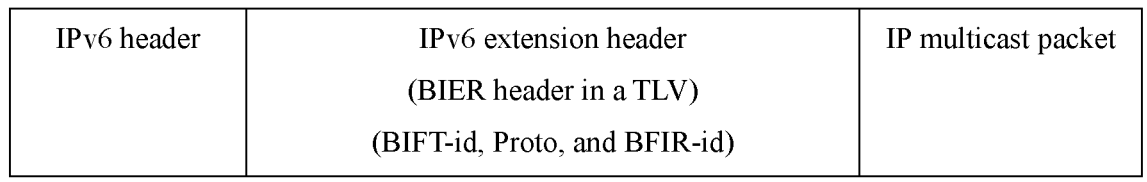
FIG. 7 shows yet another BIERv6 packet format according to an embodiment of this application.

For a BIERv6 packet format shown in FIG. 7, a second preset value is assigned to an NH field included in an IPv6 header, which indicates that the IPv6 header is followed by an IPv6 extension header. A value 60 is assigned to a next header field included in the IPv6 extension header, which indicates that a header following the IPv6 extension header is a destination options header. Functions of a BFIR-id field, a next protocol field, and a differentiated services code point (DSCP) field included in a BIER header included in the destination options header are the same as those of a source address (SA) field, the NH field, and a traffic class field included in the IPv6 header. Therefore, in the BFIR-id field, the Proto field, and the DSCP field included in the BIER header included in the destination options header, 32-bit space may be selected to carry the slice ID. The packet format shown in FIG. 7 is used for the first multicast packet in this embodiment of this application, and the device 107 that serves as a BFIR may add, based on a definition in the packet format shown in FIG. 7, the slice ID 2 to 32 bits selected from the BFIR-id field, the Proto field, and the DSCP field in the IPv6 extension header, to obtain the first BIER multicast packet.

Manner 5

For the BIERv6 packet format shown in FIG. 4 or FIG. 5, in a source address (SA) field included in an IPv6 header, 32-bit space is allocated to carry the slice ID. If the SA carries the slice ID, the SA further needs to carry DTx information (the DTx information refers to VPN information). Therefore, sufficient space needs to be reserved to ensure use for the DTx, and then in the remaining space, 32 bits are allocated for use by the slice ID. The packet format shown in FIG. 4 or FIG. 5 is used for the first multicast packet in this embodiment of this application, and the device 107 that serves as a BFIR may add, based on a definition in the packet format shown in FIG. 4 or FIG. 5, the slice ID 2 to the 32 bits included in the SA in the IPv6 header, to obtain the first BIER multicast packet.

For example, the device 107 that serves as a BFIR may add, in any one of the manner 1 to the manner 5, the obtained slice ID 2 to the first BIER multicast packet that includes the bit string, so that the intermediate BFR subsequently sends the first BIER multicast packet by using the corresponding network slice 2 based on the slice ID 2 carried in the packet.

S302: The device 107 determines a next hop of the device 107 based on a configured second forwarding entry of the device 107, and sends the first BIER multicast packet.

For example, the device 107 that serves as a BFIR may obtain the second forwarding entry by using the method in Embodiment 1. When Table 2-10 in Embodiment 1 is used for the second forwarding entry, the device 107 that serves as a BFIR obtains a sub-interface based on the bit string and the slice ID that are included in the first BIER multicast packet. When Table 2-11 and Table 2-12 in Embodiment 1 are used for the second forwarding entry, the device 107 that serves as a BFIR may search Table 2-12 based on the bit string included in the first BIER multicast packet, to obtain a physical interface, and then search Table 2-11 by using the physical interface and the slice ID, to obtain a sub-interface. The sub-interface may be a channelized sub-interface or a FlexE interface described above. When the first BIER multicast packet further includes the SI, the device 107 that serves as a BFIR may search a BFR-id field in Table 2-10 by using the SI and the bit string that are included in the first multicast packet, to determine a corresponding sub-interface, or search a BFR-id field in Table 2-12, to determine a corresponding physical interface. Specifically, the device 107 may determine, in the foregoing two manners based on 0110 and the slice ID 2 that are included in the first BIER multicast packet, that the sub-interface is 7-1-1. The device 107 sends the first BIER multicast packet by using the sub-interface 7-1-1. When there is no intermediate BFR on a path between the device that serves as a BFIR and a device that serves as a BFER, there may be a direct jump from S302 to S305 in the method provided in Embodiment 2 of this application.

S303: A device 106 determines a next hop of the device 106 based on a configured first forwarding entry of the device 106 and the first BIER multicast packet, and sends the first BIER multicast packet.

In an implementation, there is at least one intermediate BFR, for example, a device 105 and the device 106 in FIG. 1, on the path between the device that serves as a BFIR and the device that serves as a BFER. That the device that serves as a BFIR sends the first BIER multicast packet to the device that serves as a BFER means that the device that serves as a BFIR sends the first BIER multicast packet to the device that serves as a BFER by using the at least one intermediate BFR. For the manner of carrying the slice ID provided in the manner 1, the manner 2, the manner 4, or the manner 5 in S301, the intermediate BFR obtains the slice ID from a field that carries the slice ID in the first BIER multicast packet sent by the device that serves as a BFIR. The intermediate BFR searches a first forwarding entry based on the bit string and the slice ID that are included in the first BIER multicast packet, to determine a sub-interface. The intermediate BFR sends the first BIER multicast packet by using the sub-interface. For the manner of carrying the slice ID provided in the manner 3 in S301, the slice ID is carried in the DA field in the first multicast packet. To avoid impact of the slice ID on forwarding during routing and forwarding, when searching, based on the DA, a table to determine whether the received first BIER multicast packet is forwarded to the intermediate BFR, the intermediate BFR first determines, based on an address obtained after the slice ID in the DA is zeroed, that the first BIER multicast packet is sent to the intermediate BFR, and then searches a first forwarding entry by using the slice ID and the bit string, to obtain a sub-interface configured to send the first BIER multicast packet. The slice ID needs to be added to the DA field in the first BIER multicast packet sent by the intermediate BFR. For a specific addition manner, refer to the manner 3 in S301. Details are not described herein.

In the scenario shown in FIG. 1, the device 106 may obtain the slice ID 2 from the first BIER multicast packet in any one of the manner 1 to the manner 5. The device 106 queries, based on the slice ID 2 and 0110 included in the first BIER multicast packet, Table 2-3 obtained in Embodiment 1, to obtain a sub-interface 6-2-2. Alternatively, the device 106 queries, based on 0110 included in the first BIER multicast packet, Table 2-9 obtained in Embodiment 1, to obtain a physical interface 6-2, and the device 106 obtains a sub-interface 6-2-2 based on the physical interface 6-2 and the slice ID 2. The device 106 sends the first BIER multicast packet to the device 105 by using the sub-interface 6-2-2. The device 106 may perform an AND operation on an F-BM 0110 in Table 2-9 and the bit string whose value is 0110 in the first BIER multicast packet. A bit string obtained after the AND operation is the same as the bit string in the first BIER multicast packet, and no replacement or replication operation is performed.

S304: The device 105 determines a next hop of the device 105 based on a configured first forwarding entry of the device 105 and the first BIER multicast packet, and sends the first BIER multicast packet.

For example, the device 105 is an intermediate BFR, and may determine a sub-interface by using a method the same as that used by the device 106. Specifically, the device 105 may obtain the slice ID 2 from the first BIER multicast packet in any one of the manner 1 to the manner 5 in S301. In an implementation, the device 105 may search, by using the slice ID and the bit string whose value is 0110 in the first BIER multicast packet, Table 2-2 obtained in Embodiment 1, to obtain a sub-interface 5-1-1 and a sub-interface 5-2-1. The device 105 replicates the first BIER multicast packet to obtain a second BIER multicast packet and a third BIER multicast packet. The device 105 may replace the bit string whose value is 0110 in the first BIER multicast packet with 0010 in a common manner of processing a BIER multicast packet, to obtain the second BIER multicast packet. A bit string in the second BIER multicast packet is 0010. The device 105 may replace the bit string whose value is 0110 in the first BIER multicast packet with 0100 in the common manner of processing a BIER multicast packet, to obtain the third BIER multicast packet. A bit string in the third BIER multicast packet is 0100. The common manner of processing a BIER multicast packet means that when a next hop includes two devices respectively connected to BFERs, a bit string in the BIER multicast packet is replaced with a BFR-id of the BFER connected to the next hop device. The device 105 may learn, through flooding by using an IGP, that the next hop of the device 105 is connected to two devices, for example, the device 102 and the device 103. Each of the device 102 and the device 103 is a BFER. The device 105 sends the second BIER multicast packet by using the sub-interface 5-1-1, and the device 105 sends the third BIER multicast packet by using the sub-interface 5-2-1. In another implementation, the device 105 searches, by using the bit string whose value is 0110 in the first BIER multicast packet, Table 2-7 obtained in Embodiment 1, to obtain a physical interface 5-1 and a physical interface 5-2 (a bit set to 1 in a bit string included in an F-BM overlaps a bit set to 1 in the bit string in the first BIER multicast packet). The device 105 performs an AND operation on the F-BM 0100 and 0110 in the first BIER multicast packet, to obtain a bit string whose value is 0100. The device 105 replaces the bit string in the first BIER multicast packet with 0100, to obtain a third BIER multicast packet. The third BIER multicast packet includes the bit string whose value is 0100. The device 105 searches, based on the physical interface 5-2 and the slice ID 2 included in the first BIER multicast packet, Table 2-6 obtained in Embodiment 1, to obtain a sub-interface 5-2-1, and the device 105 performs an AND operation on the F-BM 0010 in Table 2-7 and 0110 in the first BIER multicast packet, to obtain a bit string whose value is 0010. The device 105 replaces the bit string in the first BIER multicast packet with 0010, to obtain a second BIER multicast packet. The second BIER multicast packet includes the bit string whose value is 0010. The device 105 searches, based on the physical interface 5-1 and the slice ID 2 included in the first BIER multicast packet, Table 2-6 obtained in Embodiment 1, to obtain a sub-interface 5-1-1. The device 105 sends the second BIER multicast packet to the device 102 by using the sub-interface 5-1-1, and the device 105 sends the third BIER multicast packet to the device 103 by using the sub-interface 5-2-1.

S305: The device that serves as a BFER obtains the multicast packet, and sends a multicast packet obtained after a BIER header is removed to a multicast receiver.

For example, after receiving the second BIER multicast packet, the device 102 that serves as a BFER determines, based on the bit string in the second BIER multicast packet, that the bit string includes a BFR-id of the device 102. That is, a second bit set to 1 from the right to the left represents the BFR-id of the device 102. The device 102 that serves as a BFER removes a BIER header in the second BIER multicast packet, and sends a multicast packet obtained after the BIER header is removed to a multicast receiver 2 connected to the device 102. After receiving the third BIER multicast packet, the device 103 that serves as a BFER determines, based on the bit string in the third BIER multicast packet, that the bit string includes a BFR-id of the device 103. That is, a third bit set to 1 from the right to the left represents the BFR-id of the device 103. The device 103 that serves as a BFER removes a BIER header in the third BIER multicast packet, and sends a multicast packet obtained after the BIER header is removed to a multicast receiver 3 connected to the device 103.

Figure 8:
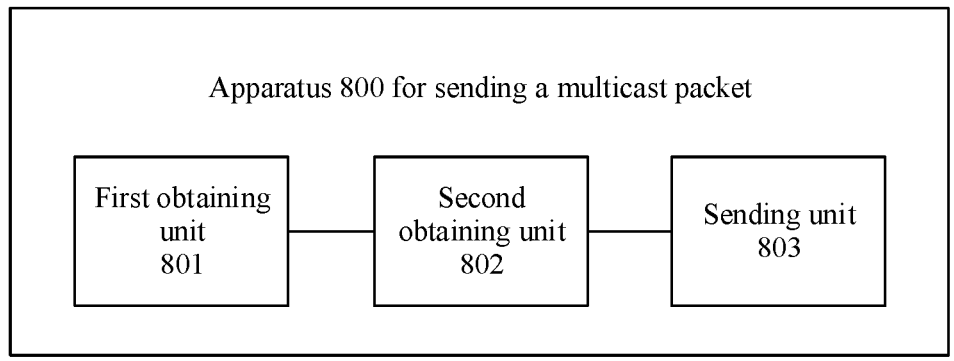
FIG. 8 is a schematic diagram of a structure of an apparatus for sending a multicast packet according to an embodiment of this application.

FIG. 8 is a schematic diagram of a structure of an apparatus for sending a multicast packet according to an embodiment of this application. The apparatus 800 for sending a multicast packet provided in the embodiment corresponding to FIG. 8 is described from a perspective of a logical structure, and may be disposed in the device that serves as a BFIR or the device that serves as an intermediate BFR in Embodiment 2, for example, the device 107, the device 106, or the device 105 in the scenario shown in FIG. 3. The structure of the apparatus for sending a multicast packet provided in this embodiment of this application is described below with reference to FIG. 8.

The apparatus 800 for sending a multicast packet is disposed in a first network device, and the apparatus 800 includes a first obtaining unit 801, a second obtaining unit 802, and a sending unit 803. The first obtaining unit 801 is configured to obtain a first multicast packet. The first multicast packet includes a bit string and an identifier of a network slice, the bit string corresponds to a second network device, and the network slice corresponds to a multicast service of the second network device. The second obtaining unit 802 is configured to obtain, based on the bit string and the identifier of the network slice, a first interface corresponding to the network slice. The sending unit 803 is configured to send the first multicast packet to the second network device by using the first interface. The first network device in which the apparatus 800 is disposed is the device 107 in Embodiment 2, the first obtaining unit 801 is configured to support the device 107 in performing S301 in Embodiment 2, and the second obtaining unit 802 and the sending unit 803 are configured to support the device 107 in performing S302 in Embodiment 2. The first network device in which the apparatus 800 is disposed is the device 106 in Embodiment 2, the first obtaining unit 801 is configured to support the device 106 in performing the step of obtaining a first BIER multicast packet in Embodiment 2, and the second obtaining unit 802 and the sending unit 803 are configured to support the device 106 in performing S303 in Embodiment 2. The first network device in which the apparatus 800 is disposed is the device 105 in Embodiment 2, the first obtaining unit 801 is configured to support the device 105 in performing the step of obtaining a first BIER multicast packet in Embodiment 2, and the second obtaining unit 802 and the sending unit 803 are configured to support the device 105 in performing S304 in Embodiment 2.

In a possible implementation, the second obtaining unit 802 is specifically configured to search a first forwarding entry by using the bit string and the identifier of the network slice that are included in the first multicast packet, to obtain an identifier of the first interface. The first forwarding entry includes the bit string, the identifier of the network slice, and the identifier of the first interface. Based on the possible implementation, the second obtaining unit 802 is further configured to: obtain the identifier of the network slice and a BFR-id of the second network device; obtain the bit string based on the BFR-id; and obtain the first forwarding entry based on the bit string and the identifier of the network slice.

In a possible implementation, the second obtaining unit 802 is specifically configured to: search a second forwarding entry by using the bit string included in the first multicast packet, to obtain an identifier of a second interface that communicates with the second network device, where the second forwarding entry includes the bit string and the identifier of the second interface; and search a first forwarding entry by using the identifier of the second interface and the identifier of the network slice included in the first multicast packet, to obtain an identifier of the first interface, where the first forwarding entry includes the identifier of the second interface, the identifier of the network slice, and the identifier of the first interface. Based on the possible implementation, the second obtaining unit 802 is further configured to: obtain the identifier of the network slice and a BFR-id of the second network device; obtain the bit string based on the BFR-id; obtain the second forwarding entry based on the bit string and the identifier of the second interface; obtain, based on the identifier of the second interface, the identifier of the first interface corresponding to the identifier of the network slice; and obtain the first forwarding entry based on the identifier of the second interface, the identifier of the first interface, and the identifier of the network slice.

For example, the first network device is a BFIR or a BFR. The first network device is a BFIR, and the first obtaining unit 801 is specifically configured to: receive a second multicast packet from a multicast source, where the second multicast packet includes multicast source and group information, and the multicast source and group information corresponds to the second network device; obtain, based on the multicast source and group information, the bit string and the identifier of the network slice that correspond to the multicast source and group information; and obtain the first multicast packet based on the second multicast packet, the bit string, and the identifier of the network slice, where the first multicast packet further includes the second multicast packet. The first network device is an intermediate BFR, and the first obtaining unit 801 is specifically configured to receive the first multicast packet sent by a BFIR.

For example, the identifier of the network slice may be carried in the following several manners: In a first possible implementation, the first multicast packet includes an IPv6 header, and the IPv6 header includes the identifier of the network slice. A destination address DA field in the IPv6 header includes the identifier of the network slice; or a source address SA field in the IPv6 header includes the identifier of the network slice. In a second possible implementation, the first multicast packet includes an IPv6 extension header, and the IPv6 extension header includes the identifier of the network slice. In a third possible implementation, the first multicast packet includes a hop-by-hop options header, and the hop-by-hop options header includes the identifier of the network slice. In a fourth possible implementation, the first multicast packet includes a destination options header, and the destination options header includes the identifier of the network slice. A BIER header in the destination options header includes the identifier of the network slice. For details, refer to the corresponding content in Embodiment 2.

For example, the first interface is a logical interface related to the second interface that communicates with the second network device. The first interface is a FlexE interface or a sub-interface. In an implementation, the network slice corresponds to one or more MVPN services. In another implementation, the network slice corresponds to one or more VPN services.

Figure 9:
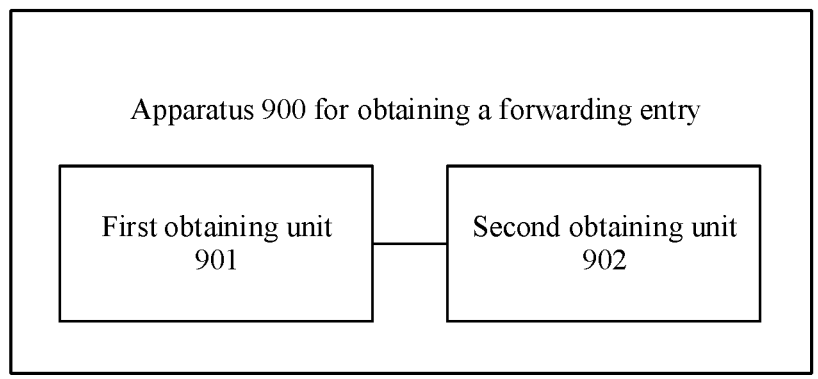
FIG. 9 is a schematic diagram of a structure of an apparatus for obtaining a forwarding entry according to an embodiment of this application.

FIG. 9 is a schematic diagram of a structure of an apparatus for obtaining a forwarding entry according to an embodiment of this application. The apparatus 900 for obtaining a forwarding entry provided in the embodiment corresponding to FIG. 9 is described from a perspective of a logical structure, and may be disposed in the device that serves as a BFIR or the device that serves as an intermediate BFR in Embodiment 1, for example, the device 107, the device 106, or the device 105 in the scenario shown in FIG. 2. The structure of the apparatus for obtaining a forwarding entry provided in this embodiment of this application is described below with reference to FIG. 9.

The apparatus 900 for obtaining a forwarding entry may be disposed in a first network device, and the apparatus 900 includes a first obtaining unit 901 and a second obtaining unit 902. The first obtaining unit 901 is configured to obtain an identifier of a network slice. The network slice corresponds to a multicast service of a second network device. The second obtaining unit 902 is configured to obtain a first forwarding entry based on the identifier of the network slice. The first forwarding entry includes the identifier of the network slice and an identifier of a first interface that communicates with the second network device.

In a possible implementation, the first forwarding entry further includes a bit string, the bit string corresponds to the second network device, and the apparatus 900 further includes a receiving unit (not shown in FIG. 9). The receiving unit is configured to receive a BFR-id sent by the second network device. The second obtaining unit 902 is further configured to obtain the bit string based on the BFR-id. Based on the possible implementation, the apparatus 900 further includes a third obtaining unit (not shown in FIG. 9). The third obtaining unit is specifically configured to: obtain a first multicast packet, where the first multicast packet includes the bit string and the identifier of the network slice; search the first forwarding entry by using the bit string and the identifier of the network slice that are included in the first multicast packet, to obtain the identifier of the first interface; and send the first multicast packet to the second network device based on the identifier of the first interface.

In a possible implementation, the first forwarding entry further includes an identifier of a second interface that communicates with the second network device, and the apparatus 900 further includes a receiving unit (not shown in FIG. 9). The receiving unit is configured to receive a BFR-id sent by the second network device. The second obtaining unit 902 is further configured to: obtain a bit string based on the BFR-id, where the bit string corresponds to the second network device; and obtain a second forwarding entry based on the bit string and the identifier of the second interface, where the second forwarding entry includes the bit string and the identifier of the second interface. Based on the possible implementation, the apparatus 900 further includes a third obtaining unit (not shown in FIG. 9). The third obtaining unit is specifically configured to: obtain a first multicast packet, where the first multicast packet includes the bit string and the identifier of the network slice; search the second forwarding entry by using the bit string included in the first multicast packet, to obtain the identifier of the second interface; and search the first forwarding entry by using the identifier of the second interface and the identifier of the network slice included in the first multicast packet, to obtain the identifier of the first interface.

For a specific manner in which the first multicast packet carries the identifier of the network slice in this embodiment, refer to the corresponding content in the embodiment corresponding to FIG. 8. Details are not described herein. For a setting granularity of the identifier of the network slice in this embodiment, refer to the corresponding content in the embodiment corresponding to FIG. 8. Details are not described herein. In this embodiment, the first network device is a BFIR or an intermediate BFR, and the second network device is a BFER.

Figure 10:
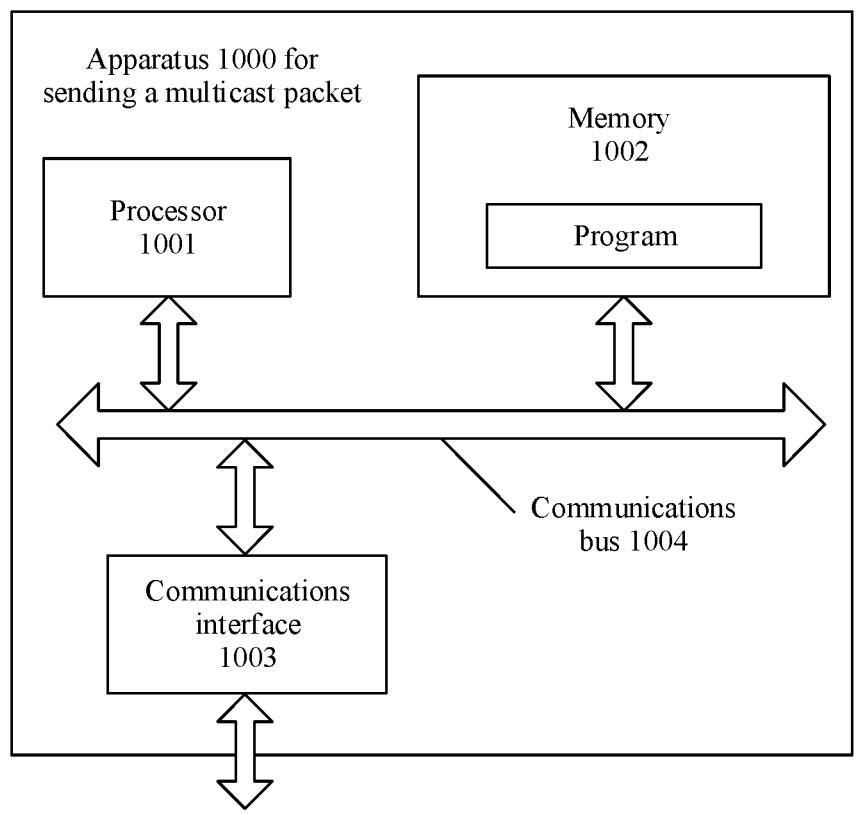
FIG. 10 is a schematic diagram of a structure of an apparatus for sending a multicast packet according to an embodiment of this application.

FIG. 10 is a schematic diagram of a structure of an apparatus for sending a multicast packet according to an embodiment of this application. The apparatus 1000 for sending a multicast packet provided in the embodiment corresponding to FIG. 10 may be the apparatus 800 for sending a multicast packet provided in the embodiment corresponding to FIG. 8. The apparatus 1000 for sending a multicast packet provided in the embodiment corresponding to FIG. 10 is described from a perspective of a hardware structure. The apparatus 1000 for sending a multicast packet includes a processor 1001, a memory 1002, a communications bus 1004, and a communications interface 1003. The processor 1001, the memory 1002, and the communications interface 1003 are connected by using the communications bus 1004. The memory 1002 is configured to store a program. When the apparatus 1000 for sending a multicast packet is disposed in a device that serves as a BFIR, the processor 1001 performs, based on executable instructions included in the program read from the memory 1002, the method performed by the device 107 in Embodiment 2. When the apparatus 1000 for sending a multicast packet is disposed in a device that serves as an intermediate BFR, the processor 1001 performs, based on executable instructions included in the program read from the memory 1002, the method performed by the device 106 or the device 105 in Embodiment 2.

Figure 11:
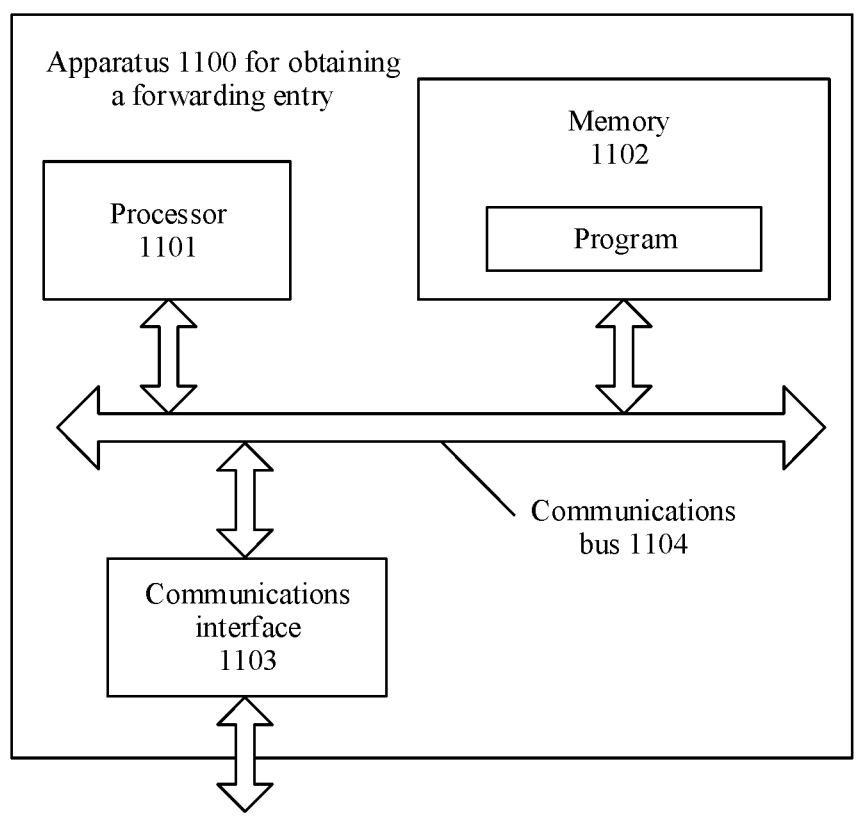
FIG. 11 is a schematic diagram of a structure of an apparatus for obtaining a forwarding entry according to an embodiment of this application.

FIG. 11 is a schematic diagram of a structure of an apparatus for obtaining a forwarding entry according to an embodiment of this application. The apparatus 1100 for obtaining a forwarding entry provided in the embodiment corresponding to FIG. 11 may be the apparatus 900 for obtaining a forwarding entry provided in the embodiment corresponding to FIG. 9. The apparatus 1100 for obtaining a forwarding entry provided in the embodiment corresponding to FIG. 11 is described from a perspective of a hardware structure. The apparatus 1100 includes a processor 1101, a memory 1102, a communications bus 1104, and a communications interface 1103. The processor 1101, the memory 1102, and the communications interface 1103 are connected by using the communications bus 1104. The memory 1102 is configured to store a program. When the apparatus 1100 for obtaining a forwarding entry is disposed in a device that serves as a BFIR, the processor 1101 performs, based on executable instructions included in the program read from the memory 1102, the method performed by the device 107 in Embodiment 1. When the apparatus 1100 for obtaining a forwarding entry is disposed in a device that serves as an intermediate BFR, the processor 1101 performs, based on executable instructions included in the program read from the memory 1102, the method performed by the device 106 or the device 105 in Embodiment 1.

An embodiment of this application provides a system. The system includes the apparatus 800 for sending a multicast packet or the apparatus 1000 for sending a multicast packet, or the system includes the apparatus 900 for obtaining a forwarding entry or the apparatus 1100 for obtaining a forwarding entry. The apparatus 800 for sending a multicast packet or the apparatus 1000 for sending a multicast packet may be configured to perform the method performed by the device that serves as a BFIR in Embodiment 2, or may be configured to perform the method performed by the device that serves as an intermediate BFR in Embodiment 2. The apparatus 900 for obtaining a forwarding entry or the apparatus 1100 for obtaining a forwarding entry may be configured to perform the method performed by the device that serves as a BFIR in Embodiment 1, or may be configured to perform the method performed by the device that serves as an intermediate BFR in Embodiment 1.

An embodiment of this application provides a chip. The chip may include the memory 1002 and the processor 1001 shown in FIG. 10. The memory 1002 is configured to store computer instructions. The processor 1001 is configured to: invoke the computer instructions from the memory 1002, and run the computer instructions, to perform the method for sending a multicast packet provided in Embodiment 2. The chip may include the memory 1102 and the processor 1101 shown in FIG. 11. The memory 1102 is configured to store computer instructions. The processor 1101 is configured to: invoke the computer instructions from the memory 1102, and run the computer instructions, to perform the method for obtaining a forwarding entry provided in Embodiment 1. The chip provided in this embodiment of this application may be disposed on forwarding hardware, or a forwarding circuit included on forwarding hardware is integrated into the chip provided in this embodiment of this application.

In this specification, the claims, and the accompanying drawings of this application, terms "first", "second", "third", "fourth", and the like are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein. In addition, terms such as "include", "have", and any variation thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

In this application, "at least one" means one or more, and "a plurality of" means two or more. "At least one of the following" or a similar expression thereof refers to any combination of these items, including a singular item or any combination of plural items. For example, at least one of a, b, or c may indicate: a, b, c, a and b, a and c, b and c, or a, b, and c, where a, b, and c may be singular or plural. In this application, it is considered that "A and/or B" includes only A, only B, and A+B.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the foregoing apparatus embodiment is merely an example. For example, division into the units is merely logical module division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, module units in embodiments of this application may be integrated into one processing unit, each of the units may exist alone physically, or two or more units may be integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The storage medium includes any medium that can store program code, such as a USB flash drive, a removable hard disk, a read-only memory (ROM), a random access memory (RAM), a magnetic disk, or an optical disc.

A person skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another place. The storage medium may be any available medium accessible to a general-purpose or special-purpose computer.

In the foregoing specific implementations, the objectives, technical solutions, and beneficial effects of the present invention are further described in detail. It should be understood that the foregoing descriptions are merely specific implementations of the present invention.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made. However, these modifications or replacements do not make the essence of the corresponding technical solutions depart from the scope of the technical solutions of embodiments of this application.

What is claimed is:

1. A method for sending a multicast packet in a network scenario comprising a first network slice for transmitting information in a unicast manner and a second network slice for transmitting information in a multicast manner, the method comprising:
obtaining, by a first network device, a first multicast packet comprising a bit string and an identifier of the second network slice,
wherein the bit string is associated with a second network device, and
wherein the second network slice is associated with a multicast service of the second network device;
searching, by the first network device, a first forwarding entry by using the bit string and the identifier of the second network slice, in the first multicast packet, to obtain an identifier of a first interface associated with the second network slice,
    wherein the first forwarding entry comprises the bit string, the identifier of the second network slice, and the identifier of the first interface; and
sending, by the first network device, the first multicast packet to the second network device by using the first interface.

2. The method according to claim 1, wherein before obtaining the first multicast packet, the method further comprises:
    obtaining, by the first network device, the identifier of the second network slice and a bit forwarding router identifier (BFR-id) of the second network device;
    obtaining, by the first network device, the bit string based on the BFR-id; and
    obtaining, by the first network device, the first forwarding entry based on the bit string and the identifier of the second network slice.

3. The method according to claim 1, wherein obtaining the first interface associated with the second network slice comprises:
    searching, by the first network device, a second forwarding entry by using the bit string comprised in the first multicast packet, to obtain an identifier of a second interface that communicates with the second network device,
        wherein the second forwarding entry comprises the bit string and the identifier of the second interface; and
    searching, by the first network device, a first forwarding entry by using the identifier of the second interface and the identifier of the second network slice comprised in the first multicast packet, to obtain an identifier of the first interface,
        wherein the first forwarding entry comprises the identifier of the second interface, the identifier of the second network slice, and the identifier of the first interface.

4. The method according to claim 3, wherein before obtaining the first multicast packet, the method further comprises:
    obtaining, by the first network device, the identifier of the second network slice and a bit forwarding router identifier (BFR-id) of the second network device;
    obtaining, by the first network device, the bit string based on the BFR-id;
    obtaining, by the first network device, the second forwarding entry based on the bit string and the identifier of the second interface;
    obtaining, by the first network device based on the identifier of the second interface,
        wherein the identifier of the first interface is associated with the identifier of the second network slice; and
    obtaining, by the first network device, the first forwarding entry based on the identifier of the second interface, the identifier of the first interface, and the identifier of the second network slice.

5. The method according to claim 1, wherein the first network device is a bit forwarding ingress router (BFIR) or an intermediate bit forwarding router (BFR).

6. The method according to claim 1, wherein the first network device is a bit forwarding ingress router (BFIR), and obtaining the first multicast packet comprises:
    receiving, by the first network device, a second multicast packet from a multicast source,
        wherein the second multicast packet comprises multicast source and group information, and the multicast source and group information associated with the second network device;
    obtaining, by the first network device based on the multicast source and group information, the bit string and the identifier of the second network slice are associated with the multicast source and group information; and
    obtaining, by the first network device, the first multicast packet based on the second multicast packet, the bit string, and the identifier of the second network slice,
        wherein the first multicast packet further comprises the second multicast packet.

7. The method according to claim 1, wherein the first network device is an intermediate bit forwarding router (BFR), and obtaining the first multicast packet comprises:
    receiving, by the first network device, the first multicast packet sent by a bit forwarding ingress router (BFIR).

8. The method according to claim 1, wherein the first multicast packet comprises an internet protocol version 6 (IPv6) header, and the IPv6 header comprises the identifier of the second network slice.

9. The method according to claim 8, wherein a destination address (DA) field in the IPv6 header comprises the identifier of the second network slice; or
    a source address (SA) field in the IPv6 header comprises the identifier of the second network slice.

10. An apparatus for sending a multicast packet in a network scenario comprising a first network slice for transmitting information in a unicast manner and a second network slice for transmitting information in a multicast manner, wherein the apparatus is disposed in a first network device, and the apparatus comprises:
    a memory storing instructions; and
    a processor coupled to the memory to execute the instructions to:
        obtain a first multicast packet comprising a bit string and an identifier of the second network slice,
            wherein the bit string is associated with a second network device, and
            wherein the second network slice is associated with a multicast service of the second network device;
        search a first forwarding entry by using the bit string and the identifier of the second network slice, in the first multicast packet, to obtain an identifier of a first interface associated with the second network slice,
            wherein the first forwarding entry comprises the bit string, the identifier of the second network slice, and the identifier of the first interface; and
        send the first multicast packet to the second network device by using the first interface.

11. The apparatus according to claim 10, wherein the processor is coupled to the memory to further execute the instructions to:
    obtain the identifier of the second network slice and a bit forwarding router identifier (BFR-id) of the second network device;
    obtain the bit string based on the BFR-id; and
    obtain the first forwarding entry based on the bit string and the identifier of the network slice.

12. The apparatus according to claim 10, wherein the processor is coupled to the memory to further execute the instructions to:
    search a second forwarding entry, by using the bit string comprised in the first multicast packet, to obtain an identifier of a second interface that communicates with the second network device, wherein the second forwarding entry comprises the bit string and the identifier of the second interface; and search a first forwarding entry, by using the identifier of the second interface and the identifier of the second network slice comprised in the first multicast packet, to obtain an identifier of the first interface,
wherein the first forwarding entry comprises the identifier of the second interface, the identifier of the second network slice, and the identifier of the first interface.

13. The apparatus according to claim 12, wherein the processor is coupled to the memory to further execute the instructions to:
obtain the identifier of the second network slice and a bit forwarding router identifier (BFR-id) of the second network device;
obtain the bit string based on the BFR-id;
obtain the second forwarding entry based on the bit string and the identifier of the second interface;
obtain, based on the identifier of the second interface, the identifier of the first interface associated with the identifier of the second network slice; and
obtain the first forwarding entry based on the identifier of the second interface, the identifier of the first interface, and the identifier of the second network slice.

14. The apparatus according to claim 10, wherein the first network device is a bit forwarding ingress router (BFIR) or an intermediate bit forwarding router (BFR).

15. The apparatus according to claim 10, wherein the first network device is a bit forwarding ingress router (BFIR), and the processor is coupled to the memory to further execute the instructions to:

receive a second multicast packet from a multicast source,
wherein the second multicast packet comprises multicast source and group information, and
wherein the multicast source and group information is associated with the second network device;
obtain, based on the multicast source and group information, the bit string and the identifier of the second network slice that are associated with the multicast source and group information; and
obtain the first multicast packet based on the second multicast packet, the bit string, and the identifier of the second network slice,
wherein the first multicast packet further comprises the second multicast packet.

16. The apparatus according to claim 10, wherein the first network device is an intermediate bit forwarding router (BFR), and the processor coupled to the memory to execute the instructions to:
receive the first multicast packet sent by a bit forwarding ingress router (BFIR).

17. The apparatus according to claim 10, wherein the first multicast packet comprises an internet protocol version 6 (IPv6) header, and the IPv6 header comprises the identifier of the second network slice.

18. The apparatus according to claim 17, wherein a destination address (DA) field in the IPv6 header comprises the identifier of the second network slice; or
a source address (SA) field in the IPv6 header comprises the identifier of the second network slice.

* * * * *